(12) United States Patent
Numako et al.

(10) Patent No.: US 8,190,020 B2
(45) Date of Patent: May 29, 2012

(54) INTERCHANGEABLE LENS AND LENS-DATA COMMUNICATION METHOD

(75) Inventors: Norio Numako, Tokyo (JP); Kazuhiro Kagami, Tokyo (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 1142 days.

(21) Appl. No.: 11/936,304

(22) Filed: Nov. 7, 2007

(65) Prior Publication Data

US 2008/0111899 A1 May 15, 2008

(30) Foreign Application Priority Data

Nov. 10, 2006 (JP) ................................ 2006-304711

(51) Int. Cl.
*G03B 17/00* (2006.01)
*G02B 7/02* (2006.01)
(52) U.S. Cl. .................... 396/532; 396/529; 359/827
(58) Field of Classification Search .................. 396/532, 396/529–531; 348/340; 359/819, 827–830
See application file for complete search history.

(56) References Cited

U.S. PATENT DOCUMENTS

| | | | |
|---|---|---|---|
| 5,349,409 A * | 9/1994 | Kawasaki et al. ............... | 396/87 |
| 6,336,754 B1 | 1/2002 | Sato et al. | |
| 6,845,218 B2 * | 1/2005 | Miyasaka et al. .............. | 396/301 |
| 7,822,339 B2 * | 10/2010 | Numako et al. ............... | 396/532 |
| 2002/0114623 A1 | 8/2002 | Uenaka | |

FOREIGN PATENT DOCUMENTS

| | | |
|---|---|---|
| JP | 1-279486 | 11/1989 |
| JP | 3-220596 | 9/1991 |
| JP | 4-349415 | 12/1992 |
| JP | 8-046843 | 2/1996 |
| JP | 11 223865 | 8/1999 |
| JP | 11 231398 | 8/1999 |
| JP | 11-231398 | 8/1999 |
| JP | 2004-021421 | 1/2004 |

OTHER PUBLICATIONS

English language Abstract of JP 11-231398.
U.S. Appl. No. 11/936,338 to Numako et al., which was filed on Nov. 7, 2007.
Japan Office action, dated Jan. 24, 2012 along with an english translation thereof.

* cited by examiner

*Primary Examiner* — Rochelle-Ann J Blackman
(74) *Attorney, Agent, or Firm* — Greenblum & Bernstein, P.L.C.

(57) ABSTRACT

An interchangeable lens which can communicate with an associated camera body when the interchangeable lens is detachably attached to the camera body to exchange data of the interchangeable lens, the interchangeable lens includes a logic IC via which the interchangeable lens communicates with the camera body; and a memory which is provided independent of the logic IC, connected to the logic IC, and stores the data of the interchangeable lens.

12 Claims, 16 Drawing Sheets

Fig.2A

| Page | Type | Address | Byte | Data Content |
|---|---|---|---|---|
| Page 00 | Zoom Data 0 | 0000 ⸱ 000F | PD0,1 | Lens Type Number |
| | | | PD2,3 | Lens Serial ID |
| | | | PD4,5 | Lens Additional Capability |
| | | | PD6,7 | AF Backlash |
| | | | PD8,9 | Focal Length |
| | | | PD10,11 | Δfocal Plane/ AF Pulse |
| | | | PD12,13 | Av Value MIN |
| | | | PD14、15 | Av Value MAX |
| Page 01 | Zoom Data 1 | 0010 ⸱ 001F | PD0,1 | Lens Type Number |
| | | | PD2,3 | Lens Serial ID |
| | | | PD4,5 | Lens Additional Capability |
| | | | PD6,7 | AF Backlash |
| | | | PD8,9 | Focal Length |
| | | | PD10,11 | Δfocal Plane/ AF Pulse |
| | | | PD12,13 | Av Value MIN |
| | | | PD14、15 | Av Value MAX |
| Page 02 | Zoom Data 2 | 0020 ⸱ 002F | PD0,1 | Lens Type Number |
| | | | PD2,3 | Lens Serial ID |
| | | | PD4,5 | Lens Additional Capability |
| | | | PD6,7 | AF Backlash |
| | | | PD8,9 | Focal Length |
| | | | PD10,11 | Δfocal Plane/ AF Pulse |
| | | | PD12,13 | Av Value MIN |
| | | | PD14、15 | Av Value MAX |
| ... | | | | |
| Page07 | Zoom Data 7 | 0070 ⸱ 007F | PD0,1 | Lens Type Number |
| | | | PD2,3 | Lens Serial ID |
| | | | PD4,5 | Lens Additional Capability |
| | | | PD6,7 | AF Backlash |
| | | | PD8,9 | Focal Length |
| | | | PD10,11 | Δfocal Plane/ AF Pulse |
| | | | PD12,13 | Av Value MIN |
| | | | PD14、15 | Av Value MAX |

Fig.2 B

| Type | Address | Data Content | Data |
|---|---|---|---|
| Zoom Data 0 | 0080,0081 | ΔFocal Plane/AF Pulse Infinity | |
| | 0082,0083 | ΔFocal Plane/AF Pulse 1m | |
| | 0084,0085 | ΔFocal Plane/AF Pulse 0.5m | |
| | 0086,0087 | ΔFocal Plane/AF Pulse 0.25m | |
| Zoom Data 1 | 0088,0089 | ΔFocal Plane/AF Pulse Infinity | |
| | 008A,008B | ΔFocal Plane/AF Pulse 1m | |
| | 008C,008D | ΔFocal Plane/AF Pulse 0.5m | |
| | 008E,008F | ΔFocal Plane/AF Pulse 0.25m | |
| Zoom Data 2 | 0090,0091 | ΔFocal Plane/AF Pulse Infinity | |
| | 0092,0093 | ΔFocal Plane/AF Pulse 1m | |
| | 0094,0095 | ΔFocal Plane/AF Pulse 0.5m | |
| | 0096,0097 | ΔFocal Plane/AF Pulse 0.25m | |
| | | ... | |
| Zoom Data 7 | 00B8,00B9 | ΔFocal Plane/AF Pulse Infinity | |
| | 00BA,00BB | ΔFocal Plane/AF Pulse 1m | |
| | 00BC,00BD | ΔFocal Plane/AF Pulse 0.5m | |
| | 00BE,00BF | ΔFocal Plane/AF Pulse 0.25m | |
| | 00C0 ~ FFDF | Blank (New Additional Zoom Data Possible) | |
| ComMon Data | FFE0,FFE1 | ROM Data Version | |
| | FFE2,FFE3 | Assembled Date and Time | |
| | FFE4 ~ FFF7 | Blank (New Additional Common Data Possible) | |
| Index Data | FFF8,FFF9 | Additional Zoom Data Leading Address | 0080 |
| | FFFA,FFFB | The Number of Bytes of Additional Zoom Data | 0008 |
| | FFFC,FFFD | Additional Common Data leading Address | FFE0 |
| | FFFE,FFFF | The Number of Bytes of Additional Common Data | 0004 |

Fig.3A

| Page | Type | Address | Byte | Data Content |
|---|---|---|---|---|
| Page 00 | Zoom Data 0 | 00 | PD0,1 | Lens Type Number |
| | | | PD2,3 | Lens Serial ID |
| | | | PD4,5 | Lens Additional Capability |
| | | ≀ | PD6,7 | AF Backlash |
| | | | PD8,9 | Focal Length |
| | | | PD10,11 | Δfocal Plane/ AF Pulse |
| | | | PD12,13 | Av Value MIN |
| | | 0F | PD14,15 | Av Value MAX |
| Page 01 | Zoom Data 1 | 10 | PD0,1 | Lens Type Number |
| | | | PD2,3 | Lens Serial ID |
| | | | PD4,5 | Lens Additional Capability |
| | | ≀ | PD6,7 | AF Backlash |
| | | | PD8,9 | Focal Length |
| | | | PD10,11 | Δfocal Plane/ AF Pulse |
| | | | PD12,13 | Av Value MIN |
| | | 1F | PD14,15 | Av Value MAX |
| Page 02 | Zoom Data 2 | 20 | PD0,1 | Lens Type Number |
| | | | PD2,3 | Lens Serial ID |
| | | | PD4,5 | Lens Additional Capability |
| | | ≀ | PD6,7 | AF Backlash |
| | | | PD8,9 | Focal Length |
| | | | PD10,11 | Δfocal Plane/ AF Pulse |
| | | | PD12,13 | Av Value MIN |
| | | 2F | PD14,15 | Av Value MAX |
| ... | | | | |
| Page 07 | Zoom Data 7 | 70 | PD0,1 | Lens Type Number |
| | | | PD2,3 | Lens Serial ID |
| | | | PD4,5 | Lens Additional Capability |
| | | ≀ | PD6,7 | AF Backlash |
| | | | PD8,9 | Focal Length |
| | | | PD10,11 | Δfocal Plane/ AF Pulse |
| | | | PD12,13 | Av Value MIN |
| | | 7F | PD14,15 | Av Value MAX |

Fig. 3 B

| Type | Address | Data Content |
|---|---|---|
| Comm on Data | 80 ⟨ FB | Blank (New Additional Data Possible) |
| | FC,FD | ROM Data version |
| | FE,FF | Assembled date and time |

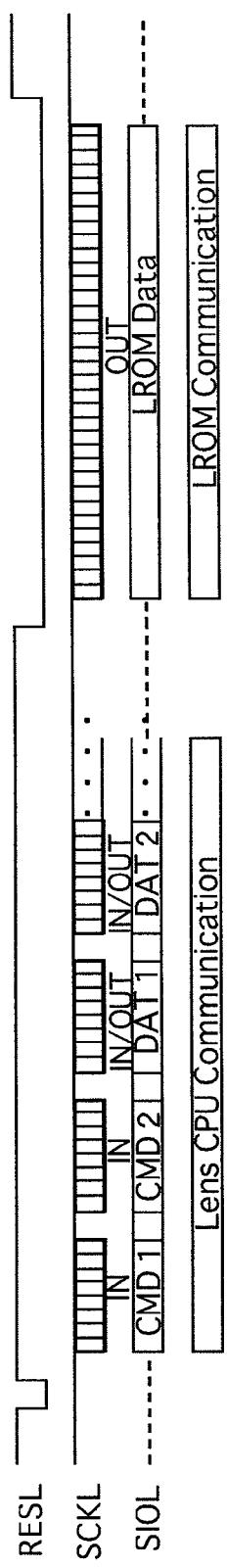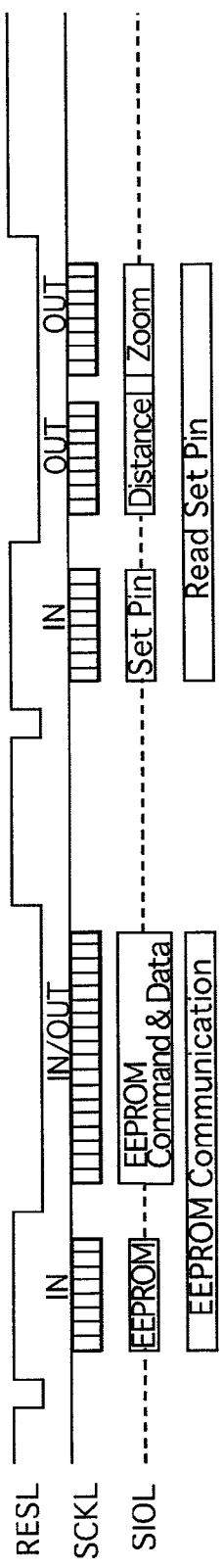
Fig. 8A General Overview
Fig. 8B

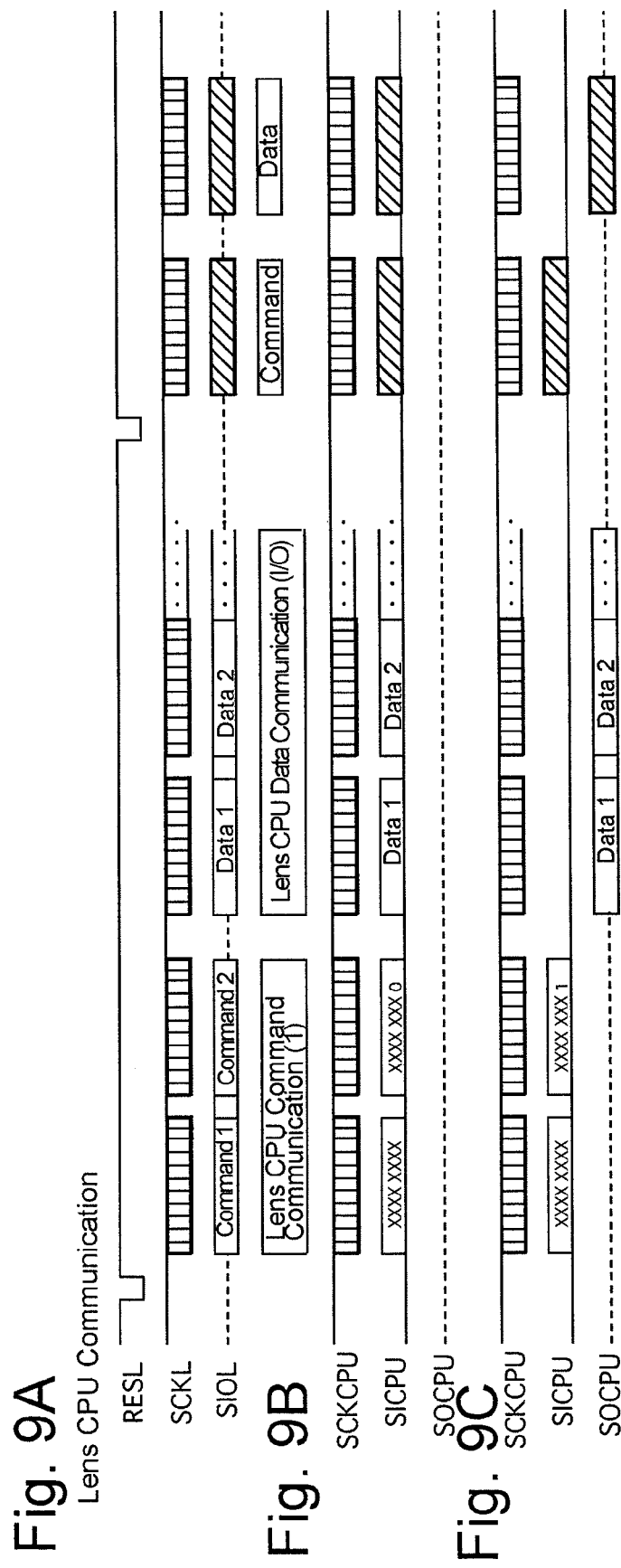

Fig. 10A

Perform LROM Communication
RESL
SCKL
SIOL — SP0 | SP1 | SP2 | PD0 | PD1 ... PD14 | PD15

Fig. 10B

Perform LROM Communication
CSEE
SCKEE
SIEE — Read | Adrs1 | Adrs2
SOEE — Output EEPROM Data (PD0~PD15)

Fig. 10C

| Byte | b7 | b6 | b5 | b4 | b3 | b2 | b1 | b0 | Content | Explanation |
|---|---|---|---|---|---|---|---|---|---|---|
| SP0 | 0 | 0 | 0 | 0 | 0 | 0 | LT1 | LT0 | Lens Type | LT1, LT0=00 : Fixed Focal Lens<br>LT1, LT0=01 : Zoom Lens<br>LT1, LT0=10 : Auxiliary Rear Converter Lens<br>LT1, LT0=11 : Prohibition |
| SP1 | LD7 | LD6 | LD5 | LD4 | LD3 | LD2 | LD1 | LD0 | Lens Capability — AF<br>AF Direction<br>Macro<br>Light Projection<br>Motion Prediction<br>Distance Ring<br>Aperture Ring<br>Power Zooming direction | 0 : MF   1 : AF<br>0 : Counterclockwise 1 : Clockwise<br>0 : NO   1 : YES<br>0 : NG   1 : OK<br>0 : Possible   1 : ImPossible<br>0 : Absence   1 : Presence<br>0 : Presence   1 : Absence<br>0:Counterclockwise1 : Clockwise |
| SP2 | 0 | 0 | 0 | ND4 | ND3 | ND2 | ND1 | ND0 | Shortest Object Distance | |

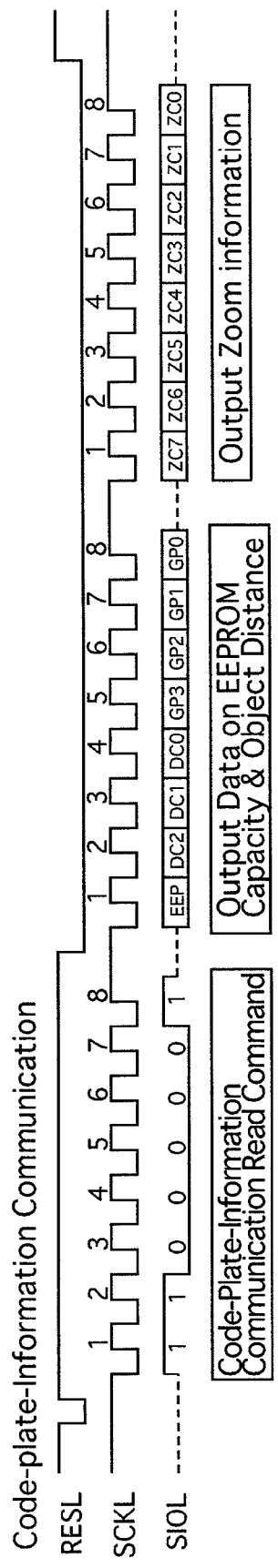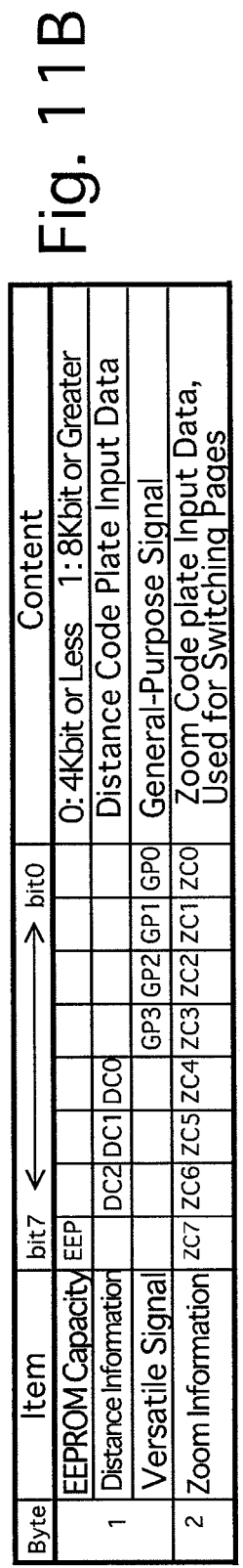

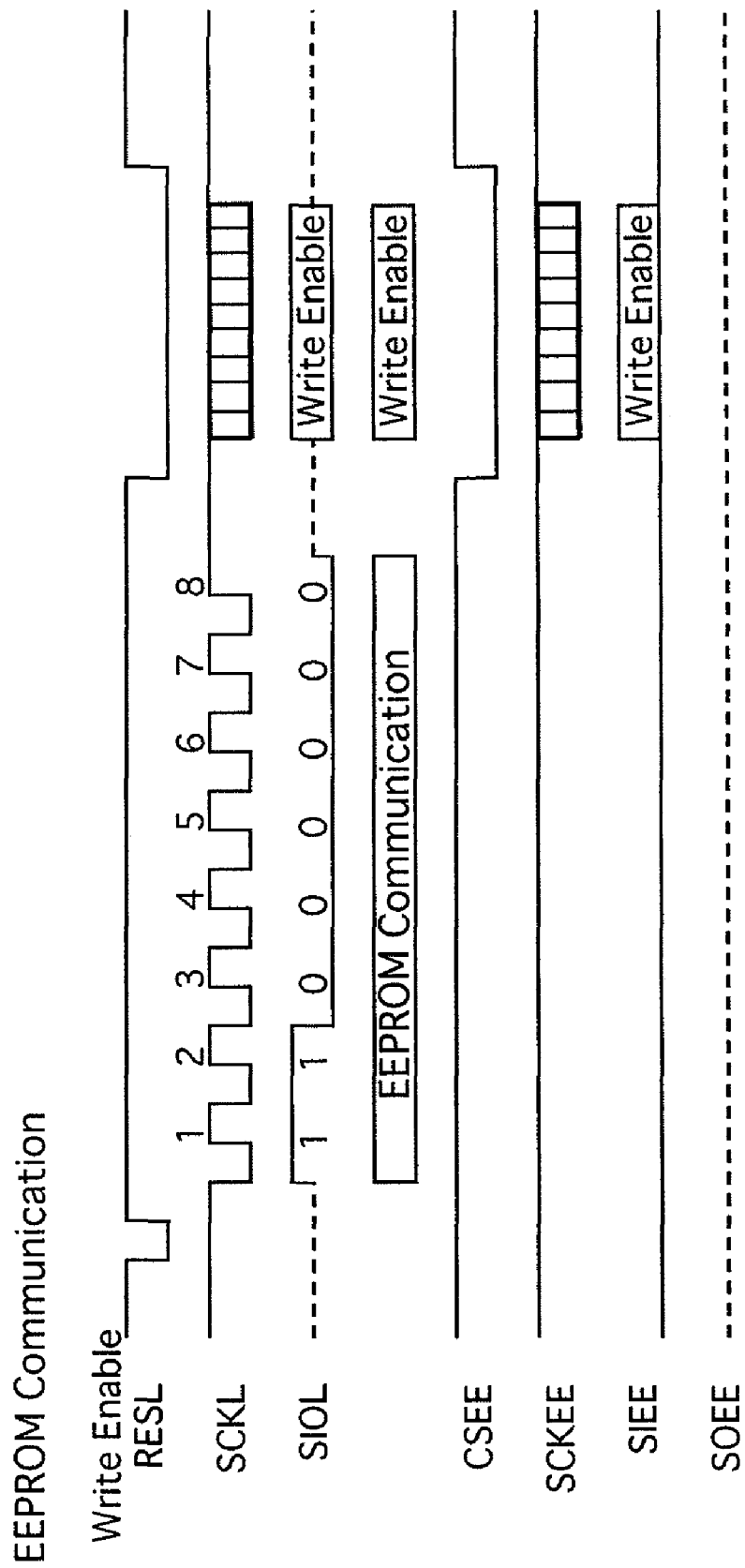

INTERCHANGEABLE LENS AND LENS-DATA COMMUNICATION METHOD

BACKGROUND OF THE INVENTION

1. Field of the Invention

The present invention relates to an interchangeable lens of a camera system. The camera system includes this interchangeable lens and a camera body to which the interchangeable lens is detachably attached. The present invention also relates to a method of performing data communications between the interchangeable lens and the camera body of the camera system.

2. Description of the Related Art

A conventional camera system is used by combining a camera body and an interchangeable lens selected from among various interchangeable lenses, and accordingly, each interchangeable lens incorporates a memory into which lens data inherent in the interchangeable lens is written so that the camera body reads out this lens data from the memory to use this lens data for controlling a photographic operation at a time of exposure. For instance, in conventional zoom lenses such as disclosed in U.S. Pat. No. 6,336,754 and Japanese Unexamined Patent Publication H11-231398, lens data is written into memory by a paging method for each focal length step because the lens data needs to be changed according to variations in focal length caused by a zooming operation. Upon the focal length of the zoom lens being changed, a page corresponding to the changed focal length is designated via hardware, and thereupon the camera body reads in all the data in this designated page.

In conventional SLR camera systems using an interchangeable zoom lens, the camera body can read in lens data quickly because a change in focal length of the zoom lens switches via hardware from the currently-selected page to a page corresponding to the changed focal length.

In recent years, in camera systems in which the camera body reads in lens data by carrying out communication with the interchangeable lens mounted to the camera body, it has been desired to enable a memory having an optimum memory capacity to be selected as a configuration in which a logic IC (gate array) serves as an interface on the interchangeable lens side and in which the memory is connected to the logic IC to enhance the degree of freedom in cost cutting and expansion of capability. Moreover, in this case also, it has been desired that the camera body can obtain lens data, which varies according to variations in focal length caused by a zooming operation or variations in object distance (photographing distance) caused by a focus adjusting operation, quickly without the need for the camera body to take the focal length and the object distance of the interchangeable lens into consideration. Furthermore, it has been desired that new exchange lenses having a larger amount of memory maintain compatibility with prior-art SLR camera bodies and camera systems.

SUMMARY OF THE INVENTION

The present invention has been devised in view of the above described problems which arise in conventional interchangeable lenses, and provides a new interchangeable lens which can incorporate a memory having an appropriate memory capacity as necessary even if the required capacity of lens data varies depending on the type of the new interchangeable lens, and which does not require the memory management on the camera body side.

According to an aspect of the present invention, an interchangeable lens is provided, which can communicate with an associated camera body when the interchangeable lens is detachably attached to the camera body to exchange data of the interchangeable lens, the interchangeable lens including a logic IC via which the interchangeable lens communicates with the camera body; and a memory which is provided independent of the logic IC, connected to the logic IC, and stores the data of the interchangeable lens.

It is desirable for the logic IC to include a memory capacity set-pin for identifying a memory capacity of the memory.

It is desirable for the interchangeable lens to include a zooming function; a zoom code detector which detects a zoom code by encoding each of a plurality of zooming ranges, which have been divided from a variable zooming range, as the zoom code; and a distance code detector which detects a distance code by encoding each of a plurality of object distance ranges, which have been divided from an object distance which varies by a focus adjusting operation, as the distance code, wherein lens data corresponding to the each different the distance code for each different the zoom code are stored in the memory in advance.

It is desirable for the logic IC to include a first group of set-pins, a second group of set-pins and a third group of set-pins. Fixed data of the interchangeable lens are determined by levels of each of the set-pins of the first, second and third groups of set-pins, and the logic IC decodes the fixed data of the first, second and third groups of set-pins via the levels thereof and transmits the fixed data to the camera body.

It is desirable for the logic IC to include a plurality of input pins via which the logic IC inputs the zoom code and the distance code which are detected by the zoom code detector and the distance code detector, respectively, wherein the logic IC selects a page of the memory in which lens data associated with the input zoom code and the input distance code is stored, from the zoom code and the distance code that the logic IC inputs via the plurality of input pins, and transmits the lens data written in the page to the camera body.

It is desirable for the memory to include a page memory area and an extended memory area.

It is desirable for a level of the memory capacity set-pin to be set to make the memory compliant with one of 1-byte addressing and 2-byte addressing in accordance with the memory capacity of the memory.

It is desirable for the logic IC to perform communication with the camera body in synchronization with a clock signal output from the camera body, and when the level of the memory capacity set-pin is set to make the memory compliant with the 1-byte addressing in the communication performed by the logic IC, the logic IC does nothing to the memory and sends information of the first group of set-pins to the camera body upon a transition of the clock signal for a first byte; the logic IC sends a read command to the memory and sends information of the second group of set-pins to the camera body upon a transition of the clock signal for a second byte; the logic IC sends to the memory an address of 1 byte which corresponds to the zoom code and sends information of the third group of set-pins to the camera body upon a transition of the clock signal for a third byte; and the logic IC sends lens data sequentially output from the memory from a page thereof, which corresponds to the address to the camera body, upon transitions of the clock signal for a fourth byte and each byte thereafter.

It is desirable for the logic IC to perform communication with the camera body in synchronization with a clock signal output from the camera body, and when the level of the memory capacity set-pin is set to make the memory compliant with the 2-byte addressing in the communication performed by the logic IC, the logic IC sends a read command to the memory and sends information on the first group of set-pins to the camera body upon a transition of the clock signal for a first byte; the logic IC sends the memory an address of a first byte which corresponds to the zoom code and sends information on the second group of set-pins to the camera body upon a transition of the clock signal for a second byte; the logic IC sends the memory an address of a second byte which corresponds to the zoom code and sends information on the third group of set-pins to the camera body upon a transition of the clock signal for a third byte; and the logic IC sends lens data sequentially output from the memory from pages thereof which correspond to the addresses of the first byte and the second byte to the camera body upon transitions of the clock signal for a fourth byte and each byte thereafter.

It is desirable for the memory to be an EEPROM.

In an embodiment, an interchangeable lens is provided, which can communicate with an associated camera body when the interchangeable lens is detachably attached to the camera body to exchange data of the interchangeable lens, the interchangeable lens including an interface circuit via which the interchangeable lens communicates with the camera body; and a memory which is provided independent of the interface circuit, connected to the interface circuit, and stores the data of the interchangeable lens, wherein the interface circuit includes a memory capacity set-pin identifying a memory capacity of the memory.

In an embodiment, a lens data communication method of performing data communications between the interchangeable lens and the camera body is provided, wherein the logic IC performs communication with the camera body in synchronization with a clock signal output from the camera body, and wherein, when the level of the memory capacity set-pin is set to make the memory compliant with the 1-byte addressing in the communication performed by the logic IC, the logic IC does nothing to the memory and sends information on the first group of set-pins to the camera body upon a transition of the clock signal for a first byte; the logic IC sends a read command to the memory and sends information on the second group of set-pins to the camera body upon a transition of the clock signal for a second byte; the logic IC sends the memory an address of 1 byte which corresponds to the zoom code and sends information of the third group of set-pins to the camera body upon a transition of the clock signal for a third byte; and the logic IC sends lens data sequentially output from the memory from a page thereof which corresponds to the address to the camera body upon transitions of the clock signal for a fourth byte and each byte thereafter. When the level of the memory capacity set-pin is set to make the memory compliant with the 2-byte addressing in the communication performed by the logic IC, the logic IC sends a read command to the memory and sends information of the first group of set-pins to the camera body upon a transition of the clock signal for a first byte; the logic IC sends to the memory an address of a first byte which corresponds to the zoom code and sends information of the second group of set-pins to the camera body upon a transition of the clock signal for a second byte; the logic IC sends to the memory an address of a second byte which corresponds to the zoom code and sends information of the third group of set-pins to the camera body upon a transition of the clock signal for a third byte; and the logic IC sends lens data sequentially output from the memory from pages thereof which correspond to the addresses of the first byte and the second byte to the camera body upon transitions of the clock signal for a fourth byte and each byte thereafter.

It is desirable for the memory to be an EEPROM.

According to the present invention, it is possible to incorporate a memory having an optimum memory capacity into the interchangeable lens even if the capacity of the memory incorporated in the interchangeable lens differs from that required by the camera body, to which the interchangeable lens is mounted. Specifically, even if the necessary memory capacity increases so as to be much greater than before, a large-capacity memory can be easily incorporated into the interchangeable lens while maintaining the compatibility with conventional products.

Since the switching between pages of the memory (addressing thereof) is done by the logic IC of the interchangeable lens, memory address management on the camera body side is not necessary, which makes it possible for the camera body to read lens information from the interchangeable lens by a simple communication algorithm.

The present disclosure relates to subject matter contained in Japanese Patent Application No. 2006-304711 (filed on Nov. 10, 2006) which is expressly incorporated herein in its entirety.

BRIEF DESCRIPTION OF THE DRAWINGS

The present invention will be discussed below in detail with reference to the accompanying drawings, in which:

FIGS. 2A and 2B show a first embodiment of memory maps of a memory incorporated in the interchangeable lens according to the present invention, wherein FIG. 2A shows a memory map of data in a conventional area of the memory and FIG. 2B shows a memory map of data in an extended area of the memory that uses an indexed addressing mode;

FIGS. 3A and 3B show a second embodiment of the memory maps of the memory incorporated in the interchangeable lens according to the present invention, wherein FIG. 3A shows a memory map of data in a conventional area of the memory and FIG. 3B shows a memory map of data in an extended area of the memory that uses a common-data extension mode;

FIGS. 8A and 8B are timing charts showing a general overview of communications performed in the SLR camera system including the interchangeable lens according to the present invention;

FIGS. 9A, 9B and 9C are timing charts for lens CPU communication performed in the SLR camera system including the interchangeable lens according to the present invention, wherein FIG. 9A shows communications between the camera body and the interchangeable lens (lens interface IC) and FIGS. 9B and 9C each show communications between the lens interface IC and the lens CPU;

FIGS. 10A and 10B are timing charts for the LROM communication performed in the SLR camera system including the interchangeable lens according to the present invention, wherein FIG. 10A shows communications between the camera body and the interchangeable lens (lens interface IC) and FIG. 10B shows communications between the lens interface IC and an EEPROM;

FIG. 10C is a data table showing information on set-pins and the contents thereof;

FIG. 11A is a timing chart showing a set-pin reading process performed in the SLR camera system including the interchangeable lens of the present invention;

FIG. 11B is a data table showing an embodiment of the contents of set-pins; and

FIGS. 12A, 12B and 12C are timing charts showing a read/write process performed in the SLR camera system including the interchangeable lens of the present invention, wherein FIG. 12A shows operations for write enable, FIG. 12B shows operations for writing, and FIG. 12C shows operations for reading.

DESCRIPTION OF THE PREFERRED EMBODIMENT

Figure 1:
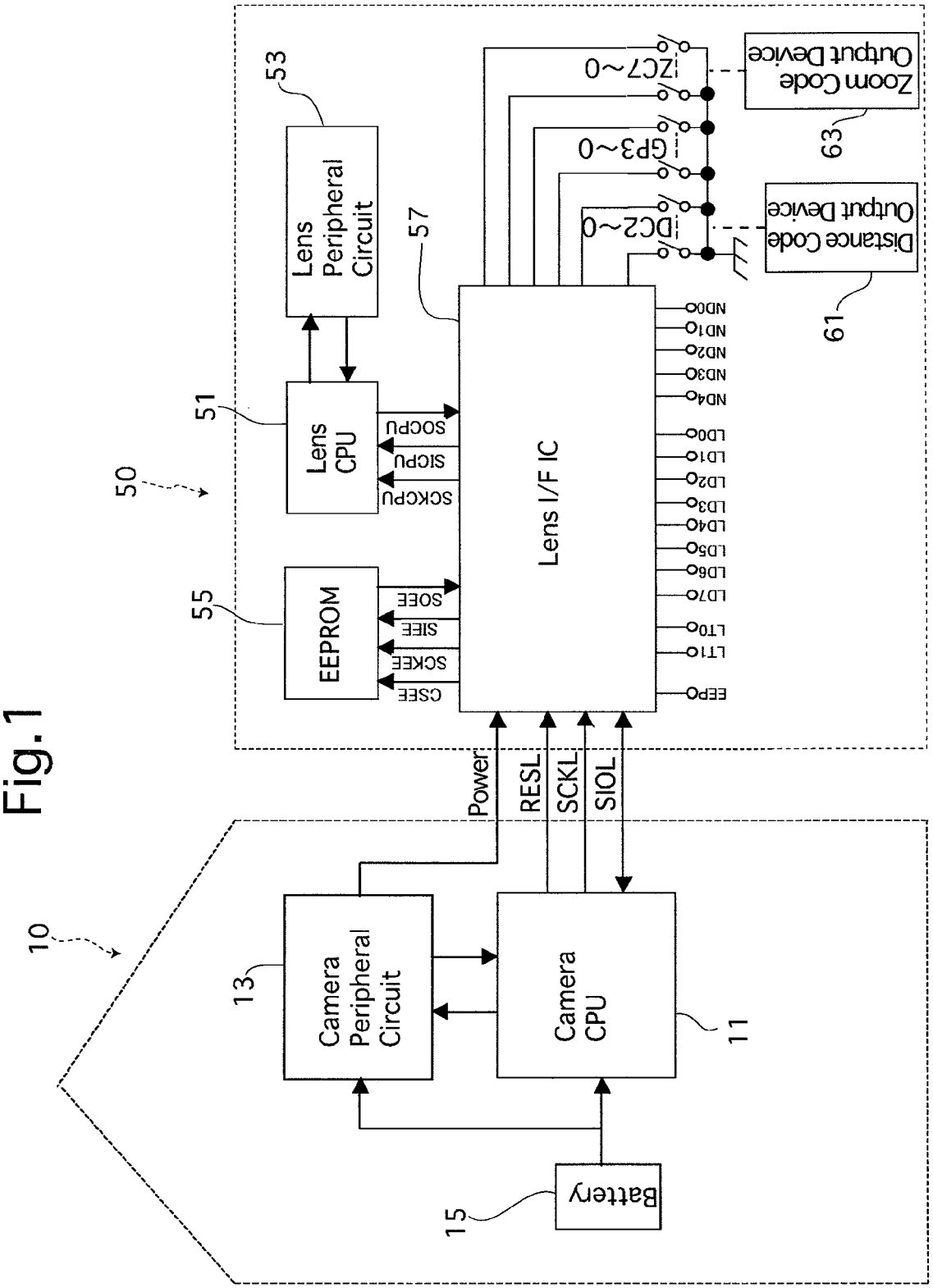
FIG. 1 is a block diagram showing the main components of an SLR camera system having an interchangeable lens according to the present invention.

An SLR camera system shown in FIG. 1 is composed of a camera body 10 and an interchangeable lens 50 which is detachably attached to the camera body 10. The camera body 10 is provided with a camera CPU 11, a camera peripheral circuit 13 and a battery 15. The camera CPU 11 comprehensively controls the overall operations of the SLR camera system, the camera peripheral circuit 13 performs auxiliary operations while carrying out communications with the camera CPU 11, and the battery 15 supplies power to the camera CPU 11, the camera peripheral circuit 13 and the interchangeable lens 50 mounted to the camera body 10.

On the other hand, the interchangeable lens 50 is provided with a lens CPU 51, a lens peripheral circuit 53, an EEPROM (memory) 55 and a lens interface IC (gate array/logic IC) 57. The lens CPU 51 controls the operation of the interchangeable lens 50, the lens peripheral circuit 53 drives a built-in AF motor and other components incorporated in the interchangeable lens 50 under control of the lens CPU 51, the EEPROM 55 serves as a nonvolatile memory in which lens data is stored, and the lens interface IC 57 serves as a logic IC (interface circuit) which relays communications between the camera CPU 11 and the lens CPU 51 and between the camera CPU 11 and the EEPROM 55. The electronic circuit incorporated in the interchangeable lens 50 operates with power supplied from the camera peripheral circuit 13. In the present embodiment, SPI (Serial Peripheral Interface) is adopted as a communication mode for the EEPROM 55.

Similar to conventional SLR cameras, the camera body 10 is provided with basic components such as a phase-difference AF sensor unit and a built-in AF motor. On the other hand, the interchangeable lens 50 is provided with basic components such as a zoom optical system, a diaphragm mechanism and a focus adjusting mechanism which are similar to those provided in conventional zoom lenses. The interchangeable lens 50 can further be provided therein with a built-in AF motor which drives the focus adjusting mechanism as a substitute for a manual operation or the built-in AF motor (not shown) of the camera body.

The lens interface IC 57 is provided with a plurality of set-pins and uses one of these set-pins as a capacity set-pin (memory capacity set-pin EEP). The number of bytes required for the lens interface IC 57 to address the EEPROM 55 is changed in accordance with the level of the memory capacity set-pin EEP. Although addressing is possible with only one byte if the memory capacity is small, two bytes are required if the memory capacity is large. Accordingly, the memory capacity set-pin EEP is set to a low ("L") level when addressing is performed using one byte, and the memory capacity set-pin EEP is set to a high ("H") level when addressing is performed using two bytes. In this manner, since the number of bytes for addressing can be selected according to the memory capacity, the lens interface IC 57 can be made to comply with the memory capacity of the EEPROM 55.

In the present embodiment of the SLR camera system, a memory capacity equal to or smaller than 4 kilobits (addressing 9 bits) is regarded as a small memory capacity, and a memory capacity equal to or greater than 8 kilobits (addressing 10 bits) is regarded as a large memory capacity. SPI is adopted as a communication mode for the EEPROM 55. The capacity of the EEPROM 55 in the present embodiment is equal to or greater than 8 kilobits. Accordingly, the memory capacity set-pin EEP is set to a high level in the present embodiment.

Additionally, in the present embodiment, distance codes are allocated to three input pins DC0 through DC2 provided on the lens interface IC 57, and zoom codes are allocated to eight input pins ZC0 through ZC7 provided on the lens interface IC 57. The interchangeable lens 50 is provided therein with a distance code output device 61 which is connected to the input pins DC0 through DC2. The distance code output device 61 makes it possible to detect the current object distance by dividing the range of the variable object distance (photographing distance) into a plurality of ranges and outputting distance codes for identifying the plurality of ranges, respectively, to the input pins DC0 through DC2. The interchangeable lens 50 is provided therein with a zoom code output device 63 which is connected to the input pins ZC0 through ZC7. The zoom code output device 63 makes it possible to detect the current focal length range by dividing the range of the variable focal length (variable zooming range) into a plurality of ranges and outputting zoom codes (focal-length codes) for identifying the plurality of ranges, respectively, to the input pins ZC0 through ZC7. Versatile codes regarding versatile data are allocated to four input pins GP0 through GP3, and each of the input pins GP0 through GP3 sets a high/low signal depending on whether it is grounded or not.

A known distance code output device and a known zoom code output device are used as the distance code output device 61 and the zoom code output device 63, respectively. For instance, the distance code output device 61 is made up of a code plate fixed to a movable lens barrel, or the like, which moves relative to a focusing lens group, and a brush which moves with the focusing lens group while sliding on the code plate. More specifically, the range of a code pattern formed on the code plate is divided into a number of ranges which makes it possible to identify the distance range from the closest object distance to the infinite object distance with 3 bits, and a distance code consisting of electrical 3-bit high/low signals generated by sliding contacts of resilient conductive strips of the brush with conductive portions of each of the divided ranges of the code pattern is allocated to each of the divided ranges of the code pattern. An electrical high/low signal which corresponds to the range of code pattern with which the brush is in contact is input to the input pins DC0 through DC2 as a distance code. Similarly, the zoom code output device 63 is made up of an 8-bit code plate and a brush, and an electrical high/low signal corresponding to the focal length range, which is generated by sliding contacts of resilient conductive strips of the brush with conductive portions of each of the divided ranges of the code pattern on the 8-bit code plate, is input to the input pins ZC0 through ZC7 as a distance code.

The lens interface IC 57 is provided with a logic circuit which decodes the distance code of a combination of high/low settings of the distance-code input pins DC0 through DC2, and the zoom code of a combination of high/low settings of the zoom-code input pins ZC0 through ZC7 to address the corresponding page of the EEPROM 55.

The camera body 10 can read out lens data stored in the page addressed by the distance-code input pins DC0 through DC2 and the zoom-code input pins ZC0 through ZC7 from the EEPROM 55. The camera body 10 carries out communications with the EEPROM 55 by addressing performed by the lens interface IC 57 physically and sequentially in accordance with the levels of the distance-code input pins DC0 through DC2 and the zoom-code input pins ZC0 through ZC7.

Since a circuit incorporated in the interchangeable lens 50 can switch between the corresponding pages of the EEPROM 55 by a zoom code signal and a distance code signal which vary by a zooming operation and a distance adjusting operation, respectively, the camera body 10 does not have to take charge of memory administration and can rapidly obtain lens data which corresponds to the currently-set focal length and the currently-set object distance.

The EEPROM 55 is provided with a page memory area and an extended memory area for addressing. In each page of the EEPROM 55, lens data corresponding to a combination of an object distance and a focal length is written. For instance, in the EEPROM 55 of the interchangeable lens 50, data corresponding to a zoom code is written in each page by a paging method that is adopted by conventional interchangeable lenses (see FIGS. 2A and 3A). Additionally, in these embodiments, the EEPROM 55 is provided with a ROM area for data access performed by addressing (see FIGS. 2B and 3B). According to a conventional method, pages are switched from one page to another by a zoom code, and data is read out of the page in which the data is written. In the present invention, each page secures a capacity of 16 bytes from PD0 through PD15, and predetermined data are allocated to each page in units of two bytes.

In FIGS. 2A through 3B, there are eight pages 00 through 07 in total, so that each page can be addressed by one byte. Although the number of pages can be increased up to 32 pages at maximum even in the case of 1-byte addressing (addressing 9 bits) if one page consists of 16 bytes, the number of pages can further be increased beyond 32 pages in the present embodiment by also making the EEPROM 55 compliant with 2-byte addressing. Namely, since the range of variable focal lengths can further be divided into a large number of ranges, appropriate data according to the focal length can be stored in the EEPROM 55 even in an interchangeable zoom lens having a high zoom power. In this case also, the communication algorithm of the camera body does not have to be changed.

FIG. 2B shows a first embodiment of an indexed addressing mode that makes it possible to further add data to zoom data controlled according to a paging method. In the indexed addressing mode, an area of 8 bytes (addresses FFF8h through FFFFh) is secured as an index, and the start address of additional zoom data and the number of bytes of the additional zoom data, and the start address of additional common data and the number of bytes of the additional common data are set as index data. By reading in this index data, the addresses and the data length of the additional zoom data and the additional common data can be determined, and reading of these data becomes possible.

Although the memory capacity in this example is the maximum capacity of 512 kilobits that 2-byte addressing can deal with, index data of 8 bytes arranged from the end address can be read in at all times by addressing addresses FFF8h through FFFFh if the capacity of the memory is equal to or greater than 8 kilobits: the minimum capacity for 2-byte addressing. Of course, it is possible to adopt the indexed addressing mode in a similar manner in the case of 1-byte addressing simply by changing the addressing of the addresses to 1F8h through 1FFh.

FIG. 3B shows a second embodiment in which common data is added to an area different from the area determined by the conventional paging method. Common data can be read in by addressing from the maximum address regardless of the memory capacity due to the common data being sequentially arranged from the end address thereof. For instance, although the total memory capacity is 256 bytes (2 kilobits) in the case shown in FIG. 3B, the end address FFh of 256 bytes can be addressed by the maximum address 1 FFh in 1-byte addressing (9 bits). If the total memory capacity becomes insufficient due to an increase in number of pages or an increase of common data from the state of memory location shown in FIG. 3B, the EEPROM 55 can deal with this situation simply by changing the 2 kilobit memory to a 4 kilobit memory and arranging common data in a similar manner from the end address (1 FFh).

In the second embodiment, the amount of movement of a focal plane per pulse of AF pulses (Δfocal plane/AF pulse) is set as additional zoom data for each range of a plurality of focal length ranges. As common data, the version of ROM data and the date/month/year of manufacture are set. These data are read by computing addresses based on the start address and the number of bytes of data which are read in from the index data and also based on a zoom code (and a distance code if necessary) obtained via a code-plate-information communication.

According to this paging method, in the interchangeable lens 50, only the page data of the EEPROM 55 which corresponds to a zoom code can be read out of the EEPROM 55 when the interchangeable lens 50 is mounted to a conventional camera body which is non-compatible with neither the common-data extension mode nor the indexed addressing mode. When the interchangeable lens 50 is mounted to a camera body compliant with the common-data extension mode and the indexed addressing mode, additional data set according to the common-data extension mode or the indexed addressing mode can be read out of the EEPROM 55 in addition to the page data of the EEPROM 55 which corresponds to a zoom code.

Figure 4:
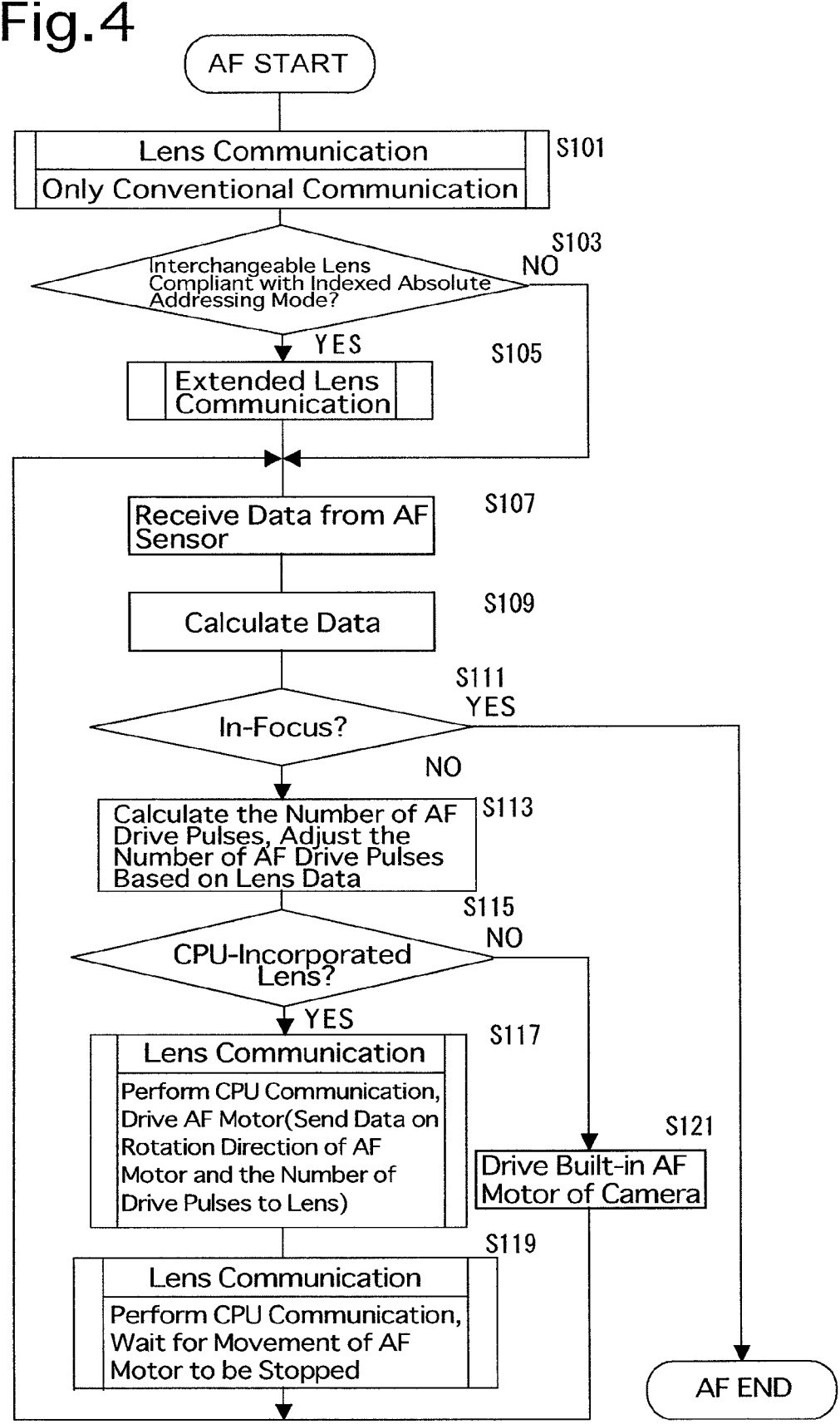
FIG. 4 is a flow chart showing an embodiment of an AF process performed in an SLR camera system including the interchangeable lens according to the present invention.
Figure 5:
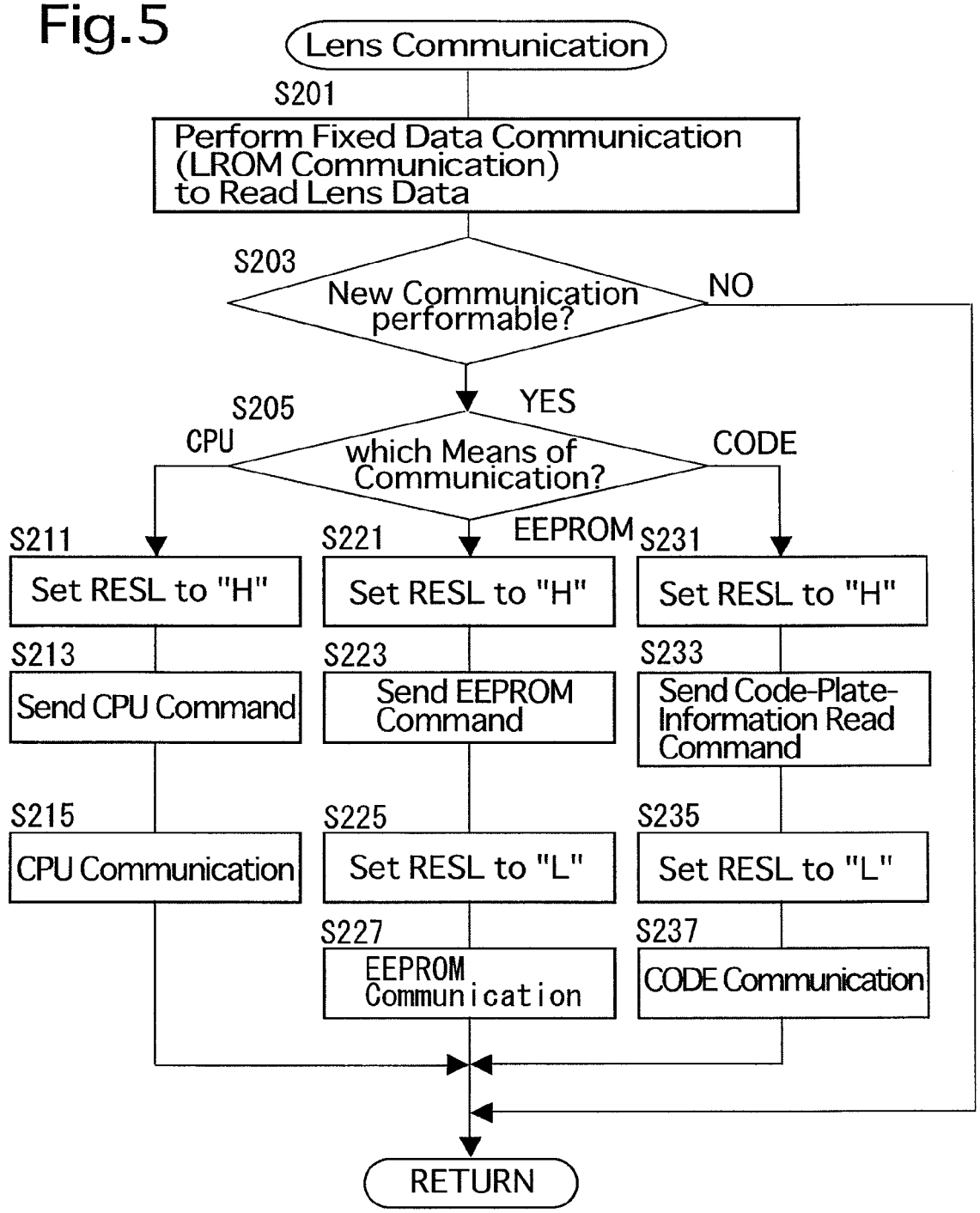
FIG. 5 is a flow chart showing an embodiment of a lens communication process performed in the SLR camera system including the interchangeable lens according to the present invention.
Figure 6:
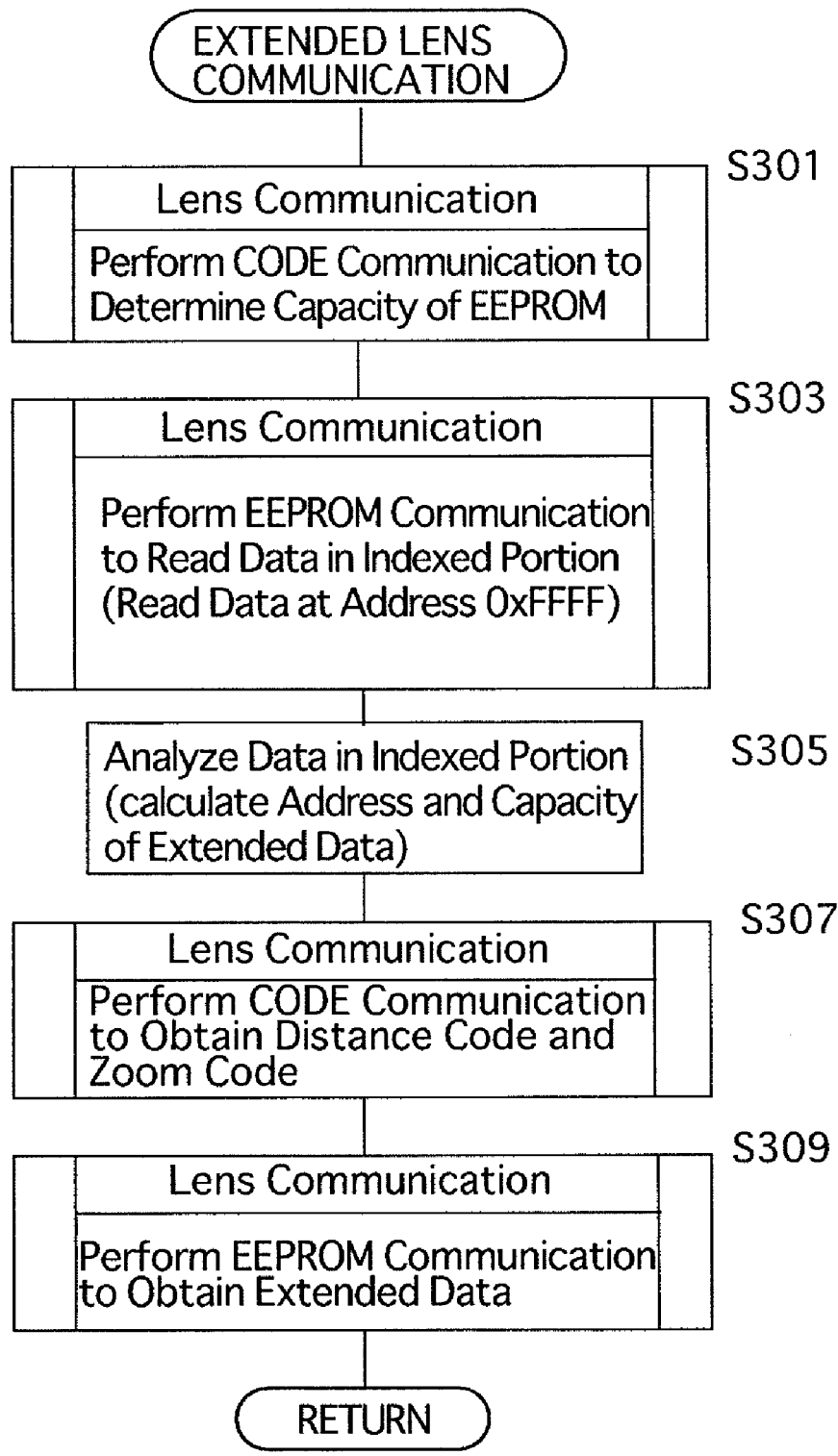
FIG. 6 is a flow chart showing an embodiment of an extended lens communication process performed in the SLR camera system including the interchangeable lens according to the present invention.
Figure 7:
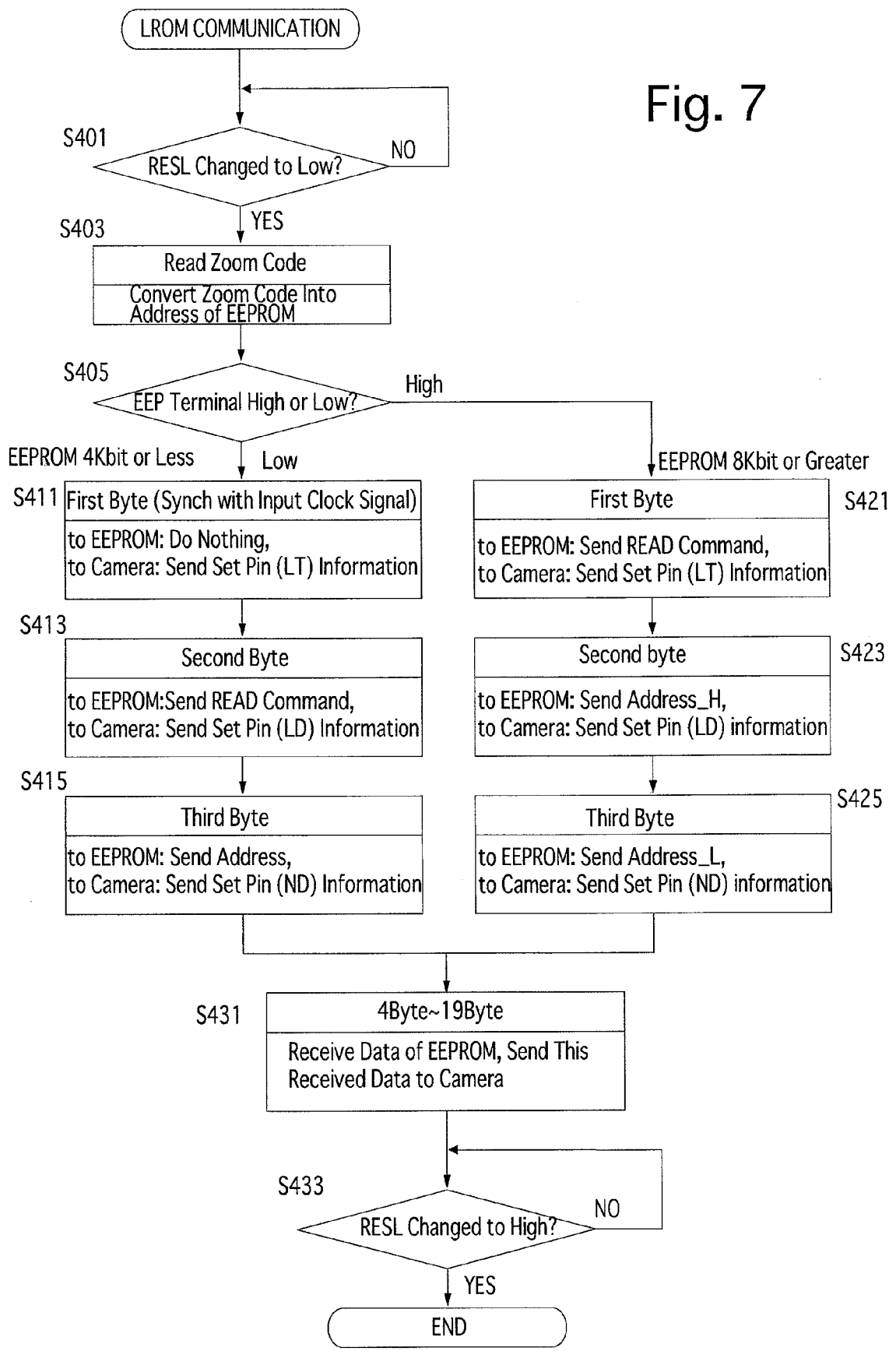
FIG. 7 is a flow chart showing an embodiment of an LROM communication process performed in the interchangeable lens according to the present invention.

An AF process including a process of reading the above described data in this camera system will be hereinafter discussed with reference to the flow charts shown in FIGS. 4 through 7 and the timing charts shown in FIGS. 8A through 12C. The processes shown in FIGS. 4 through 6 are controlled by the camera CPU 11 in the camera body 10. The process shown in FIG. 7 is a sequence of operations of the lens interface IC 57 in the interchangeable lens 50.

The AF process shown in FIG. 4 corresponds to a subroutine included in a main process performed in a conventional camera system, and is called up from the main process immediately after, e.g., a photometering switch is turned ON by a half depression of the release button (not shown) of the camera body 10. The AF process will be discussed with reference to FIGS. 8A and 8B that show an overview of the timing of main communications performed in the camera system shown in FIG. 1.

In the AF process, firstly the camera body 10 carries out communication (lens communication) with the interchangeable lens 50 (step S101). In this lens communication, only LROM (lens ROM) communication, i.e., 'fixed data communication' is carried out. Namely, the camera CPU 11 reads page data, from the interchangeable lens 50, stored in the EEPROM 55 which is addressed by the input pins DC0 through DC2 and the input pins ZC0 through ZC7.

Subsequently, it is determined whether or not the interchangeable lens mounted to the camera body 10 is an interchangeable lens compliant with either the common-data extension mode or the indexed addressing mode, i.e., whether or not the interchangeable lens mounted to the camera body 10 is the interchangeable lens 50 that is compliant with an extended lens communication (step S103). If the interchangeable lens mounted to the camera body 10 is compliant with the extended lens communication (if YES at step S103), the extended lens communication is carried out (step S105). In the extended lens communication, the camera CPU 11 refers to index data to read the data from the EEPROM 55 which is located at the address corresponding to the distance code and the zoom code. If the interchangeable lens mounted to the camera body 10 is not compliant with the extended lens communication (if NO at step S103), control skips step S105, i.e., proceeds from step S103 to step S107.

Subsequently, focus detection data (data on a pair of object images) is received from the aforementioned AF sensor unit (step S107) and a defocus calculation operation by phase difference is carried out to determine a defocus amount (step S109). Thereafter, it is determined whether or not an in-focus state has been obtained based on the defocus amount thus determined (step S111), and the AF process completes if an in-focus state has been obtained (if YES at step S111). If an in-focus state has not been obtained (if NO at step S111), operations from step S113 onwards are performed.

At step S113 the number of AF drive pulses and the driving direction of the focusing lens group (AF motor) which are necessary for bringing a main object into focus are calculated based on the determined defocus amount, and if lens data (A focal plane/AF pulse) according to the object distance has been received via the extended lens communication performed at step S105, the number of AF drive pulses is adjusted based on this lens data. Subsequently, it is determined whether or not the interchangeable lens mounted to the camera body 10 incorporates the lens CPU 51 and the AF motor (step S115). If no AF motor is incorporated in the interchangeable lens mounted to the camera body 10 (if NO at step S115), the built-in AF motor of the camera body 10 is driven to rotate in the driving direction determined at step S113 by a few pulses (step S121) and control returns to step S107. The above described loop process from step S107 to step S121 via steps S109, S111 (if NO thereat), S113 and S115 (if NO thereat) is repeated unless an in-focus state is obtained, and the AF process ends upon an in-focus state being obtained (if YES at step S111).

If the interchangeable lens mounted to the camera body 10 is the interchangeable lens 50 that incorporates an AF motor (if YES at step S115), the camera body 10 carries out communication (lens communication) with the interchangeable lens 50 to send data on the driving direction and the adjusted number of drive pulses to the interchangeable lens 50 to make the lens CPU 51 drive the built-in AF motor of the interchangeable lens 50 (step S117). Subsequently, the camera CPU 11 waits for a built-in-motor-drive termination signal, that is output from the lens CPU 51, via a communication with the interchangeable lens 50 (step S119). Upon the camera CPU 11 receiving the built-in-motor-drive termination signal, control returns to step S107. The above described loop process from step S107 to step S119 via steps S111 (if NO thereat), S113, S115 (if YES thereat) and S117 is repeated unless an in-focus state is obtained, and the AF process ends upon an in-focus state being obtained (if YES at step S111).

The lens CPU 51 drives the built-in AF motor of the interchangeable lens 50 by an amount corresponding to the AF drive pulses received from the camera body 10, and outputs the aforementioned built-in-motor-drive termination signal to the camera CPU 11 via the lens interface IC 57 upon completion of the drive of the built-in AF motor of the interchangeable lens 50.

Lens communication performed as steps S101, S117 and S119 will be hereinafter discussed in detail with reference to the flow chart shown in FIG. 6 and the timing charts shown in FIGS. 8A through 11.

In the lens communication process, firstly the camera body 10 carries out a fixed data communication (lens ROM communication) with the interchangeable lens 50 mounted to the camera body 10 to read the lens data from the EEPROM 55 which corresponds to the distance code and the zoom code (step S201).

Subsequently, it is determined whether or not new communication can be carried out between the camera body 10 and the interchangeable lens 50 (step S203). If the new communication cannot be carried out, control returns. If the interchangeable lens 50 is of a type which allows the camera body 10 to carry out the new communication with the interchangeable lens 50, the following additional three communications become available: lens CPU communication that is performed between the camera CPU 11 and the lens CPU 51, EEPROM communication that is performed between the camera CPU 11 and the EEPROM 55, and the aforementioned code-plate-information communication via which the camera CPU 11 receives information on the code plate of the distance code output device 61. If the new communication can be carried out between the camera body 10 and the interchangeable lens 50 (if YES at step S203), it is determined which of the aforementioned three communications (lens CPU communication, EEPROM communication and code-plate-information communication) is to be utilized as a means of communication (step S205). Subsequently, according to the type of communication utilized, the communication processes described below are selectively performed. The lens CPU communication, the EEPROM communication and the code-plate-information communication are performed according to the processes at steps S117, S119 and S105 (shown in FIG. 4).

[Lens CPU Communication]

Operations performed when it is determined at step S205 that the type of communication to be utilized is the lens CPU communication will be hereinafter discussed with reference to the timing chart shown in FIG. 9A. FIG. 9A shows a timing chart for communications between the camera body 10 and the lens interface IC 57. In the lens CPU communication, a reset/set terminal RESL (see FIG. 1) is first set to a low level before being subsequently set to a high level in order to initialize high/low settings of the lens interface IC 57 (step S211). Thereafter, a CPU command is sent to the lens interface IC 57 from a serial I/O terminal SIOL (see FIG. 1) in synchronization with a serial clock signal output from a clock terminal SCKL (see FIG. 1) (step S213), and subsequently, a CPU communication is performed to send and receive data corresponding to the aforementioned CPU command to and from the lens interface IC 57 (step S215), and control returns.

The CPU command output at step S213 is composed of two bytes, and the lens CPU 51 interprets the two bytes of information (which is input from the time the level of the reset/set terminal RESL rises to a high level after falling to a low level) as a command, and interprets bytes of information subsequent to the two bytes as data. The number of bytes of the received data is predetermined by this command. The data input/output direction is determined by the least significant bit (LSB) in the second byte of the CPU command. The data input/output direction is the direction from the camera body 10 to the interchangeable lens 50 if the least significant bit (LSB) is "0" and the direction from the interchangeable lens 50 to the camera body 10 if the least significant bit (LSB) is "1". FIGS. 9B and 9C are timing charts for communications between the lens CPU 51 and the lens interface IC 57, wherein FIG. 9B shows the timing when the lens CPU 51 inputs data from the camera CPU 51 via the lens interface IC 57, and FIG. 9C shows the timing when the lens CPU 51 outputs data to the camera CPU 11 via the lens interface IC 57.

[EEPROM Communication]

Operations performed when it is determined at step S205 that the type of communication to be utilized is the EEPROM communication will be hereinafter discussed with reference to the timing charts shown in FIGS. 12A through 12C. In the EEPROM communication, the reset/set terminal RESL is first set to a low level before being subsequently set to a high level to initialize high/low settings of the lens interface IC 57 (step S221).

Subsequently, an EEPROM command is sent to the lens interface IC 57 to switch connections of terminals thereof for communication to the EEPROM 55 (step S223). This switching brings the camera CPU 11 into a state (EEPROM communication state) where the camera CPU 11 can carry out communications directly with the EEPROM 55.

Subsequently, the reset/set terminal RESL is set to a low level (step S225), an EEPROM communication is performed (step S227), and control returns. In the EEPROM communication, the camera CPU 11 directly performs the read/write control of the EEPROM 55 and can read from and write into the EEPROM 55 via addressing by the camera CPU 11.

Figure 12B:
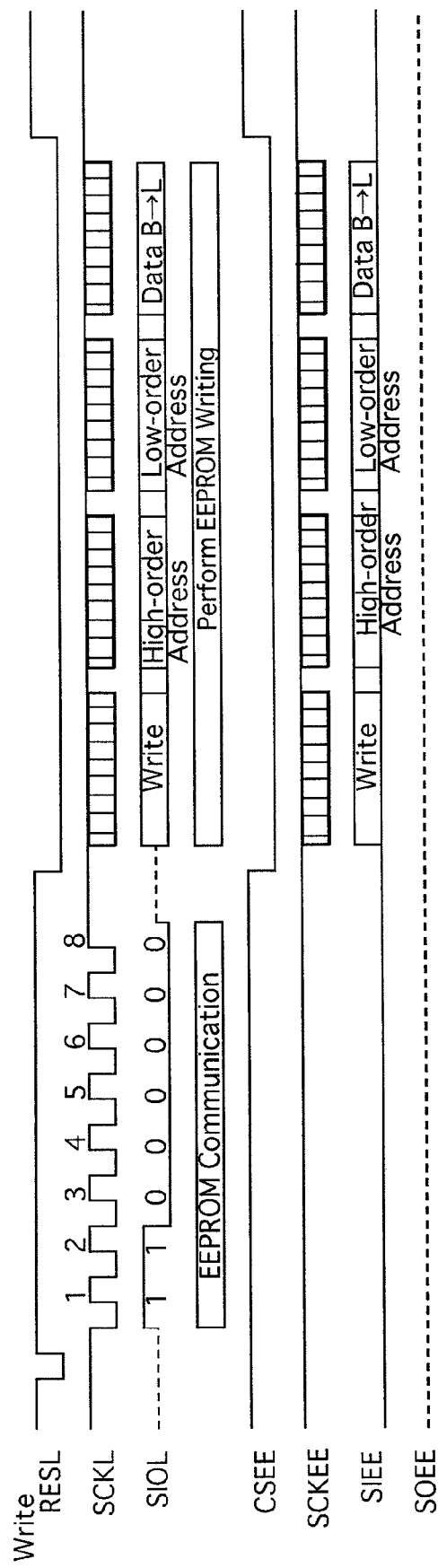
Figure 12C:
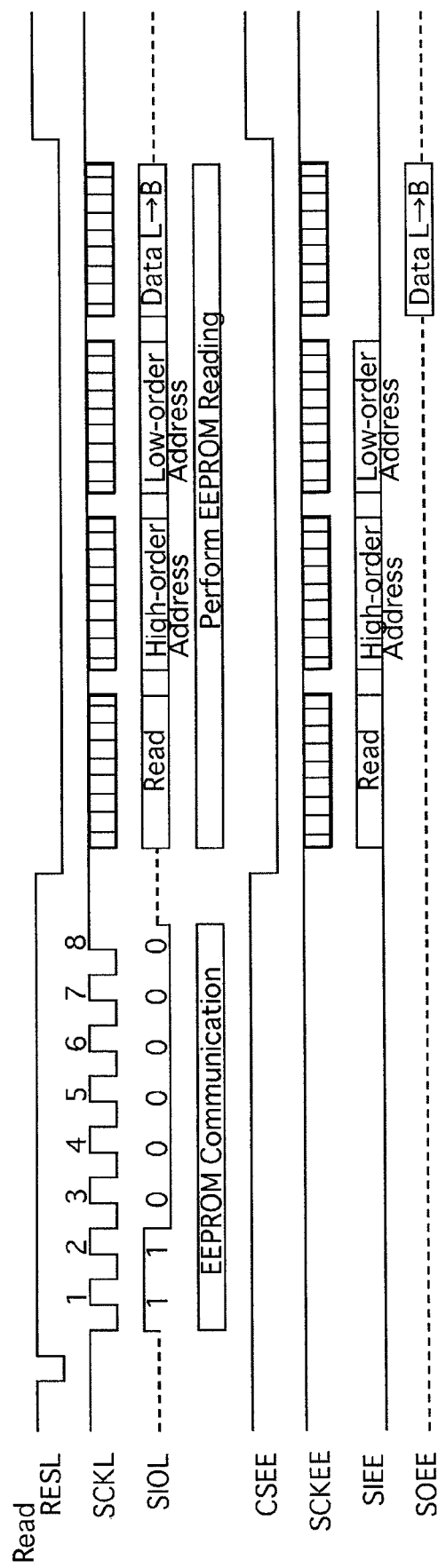

In the EEPROM communication, when writing data into the EEPROM 55, the camera CPU 11 firstly outputs a write-enable signal (see FIG. 12A). Subsequently, the camera CPU 11 outputs a write command, a high-order write address, a low-order write address and write data, and thereafter raises the level of the reset/set terminal RESL to a high level (see FIG. 12B). The sequence of these operations makes direct writing of data associated with high and low addresses of the EEPROM 55 into the EEPROM 55 possible.

In the EEPROM communication, the camera CPU 11 does not need to output the write-enable signal when reading data in from the EEPROM 55. After entering the state of the EEPROM communication, the camera CPU 11 outputs a read command, a high-order read address and a low-order read address, and thereafter the camera CPU 11 can receive data in synchronization with a serial clock signal. Upon completion of the communication, the camera CPU 11 raises the level of the reset/set terminal RESL to a high level (see FIG. 12C). The sequence of these operations allows direct reading of data associated with high and low addresses of the EEPROM 55 from the EEPROM 55.

These sequences for read/write control of the EEPROM 55 conform to the SPI communication mode.

[Code-Plate-Information Communication]

Operations performed when it is determined at step S205 that the type of communication to be utilized is the code-plate-information communication will be hereinafter discussed with reference to the timing chart and the diagram shown in FIGS. 11A and 11B, respectively. FIG. 11A is a timing chart for the code-plate-information communication and FIG. 11B is a data mapping table. In the code-plate-information communication, the reset/set terminal RESL is first set to a low level before being subsequently set to a high level to initialize high/low settings of the lens interface IC 57 (step S231), and subsequently, a code-plate-information read command is sent to the lens interface IC 57 to enable the camera CPU 11 to read information on the code plate of the distance code output device 61 (step S233). Subsequently, after the reset/set terminal RESL is set to a low level (step S235), the camera CPU 11 outputs a serial clock signal to receive information on the code plate, and control returns upon receiving information on the code plate (step S237). In the code-plate-information communication, the camera CPU 11 inputs the levels of the memory capacity set-pin EEP, the distance-code input pins DC0 through DC2, the versatile-code input pins GP0 through GP3 and the zoom-code input pins ZC0 through ZC0 through ZC7. The contents of the levels of these pins are as shown in FIG. 11B; data on the first byte is received as data on the capacity of the EEPROM 55, distance-codes and versatile-code signals, and data on the second byte is received as data on zoom information.

[Extended Lens Communication]

The extended lens communication that is performed at step S105 will be discussed in detail with reference to the flow chart shown in FIG. 6. The extended lens communication is a communication process performed by a protocol equivalent to the protocol used for the EEPROM communication. The common-data extension mode in the extended lens communication is carried out by sequentially reading a prescribed number of bytes from the end address of the EEPROM 55. The number of bytes is controlled on the camera body 10 side according to the ROM version (data on FCh and FDh) (see FIG. 2B). The remaining mode in the extended lens communication, i.e., the indexed addressing mode will be discussed hereinafter.

In the extended communication mode, firstly the camera body 10 carries out the code-plate-information communication (see steps 231 through S237 in FIG. 5; FIGS. 11A and 11B) with the interchangeable lens 50 (the lens interface IC 57) to read data on the memory capacity set-pin EEP to determine whether or not the capacity of the EEPROM 55 is equal to or smaller than 4 kilobits or is equal to or greater than 8 kilobits (step S301).

Subsequently, the EEPROM communication is carried out to read data in the indexed portion of the EEPROM 55 (step S303). In the present embodiment, 4 bytes from the end address in the EEPROM 55 are fixed as index data (see FIG. 3B). This index data can be read in by the memory capacity set-pin EEP regardless of the actual capacity of the EEPROM 55 by addressing the end address as FFFFh (if the capacity of the EEPROM 55 is equal to or greater than 8 kilobits) or 1 FFh (if the capacity of the EEPROM 55 is equal to or smaller than 4 kilobits). Communication with the EEPROM 55 is performed by the algorithm at steps S221 through S227 and the sequence according to the timing charts shown in FIGS. 12A, 12B and 12C.

The camera CPU 11 analyzes the read data in the indexed portion to calculate the address and the capacity of extended data (step S305). Subsequently, the code-plate-information communication is again performed to obtain the distance code detected by the distance code output device 61 and the zoom code detected by the zoom code output device 63 (step S307). The extended data is read from the address corresponding to the distance code and the zoom code which are obtained at step S307 (step S309), and control returns.

[LROM Communication Process in the Interchangeable Lens]

The LROM communication process that is performed in the interchangeable lens 50 will be hereinafter discussed in detail with reference to the flow chart shown in FIG. 7 and the timing charts and the table shown in FIGS. 10A, 10B and 10C. FIG. 10A is a timing chart on the camera body 10 side (timing chart for communications between the camera body 10 and the lens interface IC 57), FIG. 10B is a timing chart on the interchangeable lens 50 side (timing chart for communications between the lens interface IC 57 and the EEPROM 55), and FIG. 10C is a data mapping table showing the correspondence between data.

Upon the reset/set terminal RESL falling to a low level, the level of a terminal CSEE is dropped to a low level, and three bytes of set-pin data SP0 through SP2 are output in the communication for the first three bytes in synchronization with a clock signal output from the clock terminal SCKL. The set-pin data SP0 through SP2 are set by the lens type set-pins (first group of set-pins) LT1 and LT2, lens capability set-pins (second group of set-pins) LD0 through LD7 and shortest object distance set-pins (third group of set-pins) ND0 through ND4 that show the shortest object distance, and the level of each set-pin is sequentially read and physically decoded by the lens interface IC 57 to be output therefrom. An example of the contents thereof is as shown in a data table of FIG. 10C. The lens type set-pins LT1 and LT2 provide lens type set-pin LT information for setting a lens type; the lens capability set-pins LD0 through LD7 provide lens capability set-pin LD information for setting capabilities of the interchangeable lens 50 such as AF, AF direction, macro and light projection; and shortest object distance set-pins ND0 through ND4 provide shortest object distance set-pin ND information which shows the shortest object distance.

Page data of the EEPROM 55 which is addressed by the zoom-code input pins ZC0 through ZC7 is read out by a communication of 16 bytes from the fourth byte onwards. The lens interface IC 57 outputs the clock signal input from the clock terminal SCKL to a terminal SCKEE, outputs a read command and address data to a terminal SIEE, and reads data which is output from a terminal SOEE. This read data is sent (transferred) to the camera CPU 11 via the serial I/O terminal SIOL.

The LROM communication process in the interchangeable lens 50 will be hereinafter discussed with reference to the flow chart shown in FIG. 7 and the timing charts shown in FIGS. 10A and 10B. FIG. 7 is a flowchart showing a sequence of operations in the lens interface IC 57 with respect to the LROM communication. However, the lens interface IC 57 in the present embodiment is a logic IC, and the process shown in FIG. 7 is physically processed. The lens interface IC 57 performs the LROM communication according to (in synchronization with) a serial clock signal that the camera CPU 11 outputs to the clock terminal SCKL with the reset/set terminal RESL being set at a low level.

In the LROM communication process, firstly it is determined whether or not the level of the reset/set terminal RESL has fallen to a low level (step S401). Namely, the lens interface IC 57 waits for the level of the reset/set terminal RESL to fall to a low level at step S401. Upon the level of the reset/set terminal RESL falling to a low level (if YES at step S401), the lens interface IC 57 reads in zoom code (the levels of the input pins ZC0 through ZC7) and converts the zoom code into address data for the EEPROM 55 (step S403).

The lens interface IC 57 reads the level of the memory capacity set-pin EEP to determine the high/low state thereof (step S405). The memory capacity set-pin EEP is set at a low level if the memory capacity is equal to or smaller than 4 kilobits and to a high level if the memory capacity is equal to or greater than 8 kilobits.

If the level of the memory capacity set-pin EEP is a low level (if Low at step S405), in the communication for the first byte, the lens interface IC 57 does nothing to the EEPROM 55 and sends the lens type set-pin LT information to the camera CPU 11 (step S411). In the communication for the second byte, the lens interface IC 57 sends a read command to the EEPROM 55 and sends the lens capability set-pin LD information to the camera CPU 11 (step S413). In the communication for the third byte, the lens interface IC 57 sends the EEPROM 55 the address of 1 byte that the lens interface IC 57 has converted from the read zoom code, and sends the shortest object distance set-pin ND information to the camera CPU 11 (step S415). Thereafter, in the communication for the fourth byte to the nineteenth byte, the lens interface IC 57 receives data of the EEPROM 55 sequentially from the address thereof which the lens interface IC 57 has sent to the EEPROM 55 at step S415, and sends (transfers) the data thus received to the camera CPU 11 (step S431). Thereafter, it is determined whether or not the level of the reset/set terminal RESL has risen to a high level (step S433). Namely, the lens interface IC 57 waits for the level of the reset/set terminal RESL to rise to a high level at step S433. Upon the level of the reset/set terminal RESL rising to a high level (if YES at step S433), the lens interface IC 57 ends the LROM communication process.

If the level of the memory capacity set-pin EEP is a high level (if High at step S405), in the communication for the first byte the lens interface IC 57 sends a read command to the EEPROM 55 and sends the lens type set-pin LT information to the camera CPU 11 (step S421). In the communication for the second byte, the lens interface IC 57 sends the EEPROM 55 a high-order address_H among the address data that the lens interface IC 57 has converted from the read zoom code at step S403 (step S423). In the communication for the third byte, the lens interface IC 57 sends the EEPROM 55 a low-order address_L among the address data that the lens interface IC 57 has converted from the read zoom code at step S403 (step S423) and sends the shortest object distance set-pin ND information to the camera CPU 11 (step S425). Thereafter, in the communication for the fourth byte to the nineteenth byte, the lens interface IC 57 receives data of the EEPROM 55 sequentially from the addresses thereof designated by the high-order address_H and the low-order address_L that the lens interface IC 57 has sent to the EEPROM 55 at steps S423 and 425, respectively, and sends the data thus received to the camera CPU 11 (step S431). Upon completion of the transmission of this data to the camera CPU 11, the lens interface IC 57 waits for the level of the reset/set terminal RESL to rise to a high level at step S433. Upon the level of the reset/set terminal RESL rising to a high level (if YES at step S433), the lens interface IC 57 ends the LROM communication process.

According to the above described embodiment of the interchangeable lens, a new interchangeable lens is achieved which can incorporate a memory having an appropriate memory capacity as necessary even if the required capacity of lens data varies depending on the type of new interchangeable lens, and which is compatible with the known memory management in the camera body even if the number of bytes for addressing varies according to the capacity of the incorporated memory. Moreover, a lens data communication method is achieved by which a new interchangeable lens can incorporate a memory having an appropriate memory capacity as necessary even if the required capacity of lens data varies depending on the type of new interchangeable lens, and by which the interchangeable lens is compatible with the known memory management in the camera body even if the number of bytes for addressing varies according to the capacity of the incorporated memory.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An interchangeable lens which can communicate with an associated camera body when said interchangeable lens is detachably attached to said camera body to exchange data of said interchangeable lens, said interchangeable lens comprising:
   a logic IC via which said interchangeable lens communicates with said camera body; and
   a memory which is provided independent of said logic IC, connected to said logic IC, and stores said data of said interchangeable lens,
   wherein said logic IC comprises a memory capacity set-pin that identifies a memory capacity of said memory.

2. The interchangeable lens according to claim 1,
   wherein said interchangeable lens comprises:
      a zoom code detector which detects a zoom code by encoding each of a plurality of zooming ranges, which have been divided from a variable zooming range, as said zoom code; and
      a distance code detector which detects a distance code by encoding each of a plurality of object distance ranges, which have been divided from an object distance
   which varies by a focus adjusting operation, as said distance code, and
   wherein lens data corresponding to said each different said distance code for each different said zoom code are stored in said memory in advance.

3. The interchangeable lens according to claim 1,
   wherein said logic IC comprises a first group of set-pins, a second group of set-pins and a third group of set-pins,
   wherein fixed data of said interchangeable lens are determined by levels of each of said set-pins of said first, second and third groups of set-pins, and
   wherein said logic IC decodes said fixed data of said first, second and third groups of set-pins via said levels thereof and transmits said fixed data to said camera body.

4. The interchangeable lens according to claim 2,
   wherein said logic IC comprises a plurality of input pins via which said logic IC inputs said zoom code and said distance code which are detected by said zoom code detector and said distance code detector, respectively, and
   wherein said logic IC selects a page of said memory in which lens data associated with said input zoom code and said input distance code is stored, from said zoom code and said distance code that said logic IC inputs via said plurality of input pins, and transmits said lens data written in said page to said camera body.

5. The interchangeable lens according to claim 1,
   wherein said memory comprises a page memory area and an extended memory area.

6. The interchangeable lens according to claim 1,
   wherein a level of said memory capacity set-pin is set to make said memory compliant with one of 1-byte addressing and 2-byte addressing in accordance with said memory capacity of said memory.

7. The interchangeable lens according to claim 6,
   wherein said logic IC performs communication with said camera body in synchronization with a clock signal output from said camera body, and
   wherein when said level of said memory capacity set-pin is set to make said memory compliant with said 1-byte addressing in said communication performed by said logic IC, said logic IC does nothing to said memory and sends information of said first group of set-pins to said camera body upon a transition of said clock signal for a first byte; said logic IC sends a read command to said memory and sends information of said second group of set-pins to said camera body upon a transition of said clock signal for a second byte; said logic IC sends to said memory an address of 1 byte which corresponds to said zoom code and sends information of said third group of set-pins to said camera body upon a transition of said clock signal for a third byte; and said logic IC sends lens data sequentially output from said memory from a page thereof, which corresponds to said address to said camera body, upon transitions of said clock signal for a fourth byte and each byte thereafter.

8. The interchangeable lens according to claim 6,
   wherein said logic IC performs communication with said camera body in synchronization with a clock signal output from said camera body, and
   wherein when said level of said memory capacity set-pin is set to make said memory compliant with said 2-byte addressing in said communication performed by said logic IC, said logic IC sends a read command to said memory and sends information on said first group of set-pins to said camera body upon a transition of said clock signal for a first byte; said logic IC sends said memory an address of a first byte which corresponds to said zoom code and sends information on said second group of set-pins to said camera body upon a transition of said clock signal for a second byte; said logic IC sends said memory an address of a second byte which corresponds to said zoom code and sends information on said third group of set-pins to said camera body upon a transition of said clock signal for a third byte; and said logic IC sends lens data sequentially output from said memory from pages thereof which correspond to said addresses of said first byte and said second byte to said camera body upon transitions of said clock signal for a fourth byte and each byte thereafter.

9. A lens data communication method of performing data communications between said interchangeable lens and said camera body according to claim 6,
   wherein said logic IC performs communication with said camera body in synchronization with a clock signal output from said camera body,
   wherein, when said level of said memory capacity set-pin is set to make said memory compliant with said 1-byte addressing in said communication performed by said logic IC, said logic IC does nothing to said memory and sends information on said first group of set-pins to said camera body upon a transition of said clock signal for a first byte; said logic IC sends a read command to said memory and sends information on said second group of set-pins to said camera body upon a transition of said clock signal for a second byte; said logic IC sends said memory an address of 1 byte which corresponds to said zoom code and sends information of said third group of set-pins to said camera body upon a transition of said clock signal for a third byte; and said logic IC sends lens data sequentially output from said memory from a page thereof which corresponds to said address to said camera body upon transitions of said clock signal for a fourth byte and each byte thereafter, and wherein, when said level of said memory capacity set-pin is set to make said memory compliant with said 2-byte addressing in said communication performed by said logic IC, said logic IC sends a read command to said memory and sends information of said first group of set-pins to said camera body upon a transition of said clock signal for a first byte; said logic IC sends to said memory an address of a first byte which corresponds to said zoom code and sends information of said second group of set-pins to said camera body upon a transition of said clock signal for a second byte; said logic IC sends to said memory an address of a second byte which corresponds to said zoom code and sends information of said third group of set-pins to said camera body upon a transition of said clock signal for a third byte; and said logic IC sends lens data sequentially output from said memory from pages thereof which correspond to said addresses of said first byte and said second byte to said camera body upon transitions of said clock signal for a fourth byte and each byte thereafter.

10. The lens data communication method according to claim 9,
wherein said memory comprises an EEPROM.

11. The interchangeable lens according to claim 6,
wherein said memory comprises an EEPROM.

12. An interchangeable lens which can communicate with an associated camera body when said interchangeable lens is detachably attached to said camera body to exchange data of said interchangeable lens, said interchangeable lens comprising:
 an interface circuit via which said interchangeable lens communicates with said camera body; and
 a memory which is provided independent of said interface circuit, connected to said interface circuit, and stores said data of said interchangeable lens,
 wherein said interface circuit comprises a memory capacity set-pin that identifies a memory capacity of said memory.

* * * * *